US009436831B2

United States Patent
Ellis et al.

(10) Patent No.: US 9,436,831 B2
(45) Date of Patent: Sep. 6, 2016

(54) SECURE ERASE IN A MEMORY DEVICE

(71) Applicant: SanDisk Enterprise IP LLC, Milpitas, CA (US)

(72) Inventors: Robert W. Ellis, Phoenix, AZ (US); Gregg S. Lucas, Tucson, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/135,245

(22) Filed: Dec. 19, 2013

(65) Prior Publication Data

US 2015/0121537 A1 Apr. 30, 2015

Related U.S. Application Data

(60) Provisional application No. 61/897,782, filed on Oct. 30, 2013.

(51) Int. Cl.
*G06F 7/04* (2006.01)
*G06F 17/30* (2006.01)
*H04N 7/16* (2011.01)
*G06F 21/60* (2013.01)
(Continued)

(52) U.S. Cl.
CPC ............... *G06F 21/60* (2013.01); *G06F 12/00* (2013.01); *G06F 21/79* (2013.01); *G06F 2221/2143* (2013.01)

(58) Field of Classification Search
CPC ....................................................... G06F 21/60
USPC ............................................................ 726/26
See application file for complete search history.

(56) References Cited

U.S. PATENT DOCUMENTS 4,173,737 A * 11/1979 Skerlos et al. ............. 455/185.1
4,888,750 A * 12/1989 Kryder et al. ............. 369/13.25
(Continued)

FOREIGN PATENT DOCUMENTS

EP  1 299 800        4/2003
EP  1465203 A1      10/2004
(Continued)

OTHER PUBLICATIONS

A. Ashkenazi; Platform independent overall security architecture in multi-processor system-on-chip integrated circuits for use in mobile phones and handheld devices; Science Direct; Year: 2007; p. 407-425.*
(Continued)

*Primary Examiner* — Monjour Rahim
(74) *Attorney, Agent, or Firm* — Morgan, Lewis & Bockius LLP

(57) ABSTRACT

The various implementations described herein include systems, methods and/or devices used to enable secure erase in a memory device. In one aspect, the method includes detecting a secure erase trigger. The method further includes determining a secure erase algorithm from among one or more secure erase algorithms to use in accordance with the detected secure erase trigger. The method further includes performing a secure erase operation in accordance with the selected secure erase algorithm, the secure erase operation including: (1) signaling a secure erase condition to a plurality of controllers on the memory device, (2) erasing one or more non-volatile memory devices on the memory device, (3) monitoring the secure erase operation, and (4) recording data related to the secure erase operation.

30 Claims, 9 Drawing Sheets

(51) Int. Cl.
  *G06F 12/00* (2006.01)
  *G06F 21/79* (2013.01)

(56) References Cited

U.S. PATENT DOCUMENTS

| | | |
|---|---|---|
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,404,485 A | 4/1995 | Ban |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A * | 3/1999 | Chevallier ............ 711/103 |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,275,170 B2 | 9/2007 | Suzuki |
| 7,295,479 B2 | 11/2007 | Yoon et al. |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 * | 8/2012 | Guyot et al. ............ 713/193 |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,832,384 B1 | 9/2014 | de la Iglesia |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,043,517 B1 | 5/2015 | Sprouse et al. |
| 9,128,690 B2 | 9/2015 | Lotzenburger et al. |
| 2001/0050824 A1 | 12/2001 | Buch |
| 2002/0024846 A1 | 2/2002 | Kawahara et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |

(56) References Cited

U.S. PATENT DOCUMENTS

| | | |
|---|---|---|
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1* | 6/2004 | Talbert .......................... 360/60 |
| 2004/0143710 A1* | 7/2004 | Walmsley .................... 711/144 |
| 2004/0148561 A1 | 7/2004 | Shen et al. |
| 2004/0153902 A1 | 8/2004 | Machado et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0195650 A1 | 8/2006 | Su et al. |
| 2006/0244049 A1 | 11/2006 | Yaoi et al. |
| 2006/0259528 A1 | 11/2006 | Dussud et al. |
| 2006/0291301 A1 | 12/2006 | Ziegelmayer |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwall et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |

(56) References Cited

U.S. PATENT DOCUMENTS

| | | |
|---|---|---|
| 2010/0020620 A1 | 1/2010 | Kim et al. |
| 2010/0037012 A1 | 2/2010 | Yano et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2011/0010514 A1 | 1/2011 | Benhase et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072302 A1* | 3/2011 | Sartore ............... G11C 16/349 714/6.32 |
| 2011/0078407 A1 | 3/2011 | Lewis |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203951 A1 | 8/2012 | Wood et al. |
| 2012/0210095 A1 | 8/2012 | Nellans et al. |
| 2012/0216079 A1* | 8/2012 | Fai et al. .................. 714/42 |
| 2012/0233391 A1 | 9/2012 | Frost et al. |
| 2012/0236658 A1* | 9/2012 | Byom et al. ............. 365/185.25 |
| 2012/0239858 A1* | 9/2012 | Melik-Martirosian ....... 711/103 |
| 2012/0239868 A1 | 9/2012 | Ryan et al. |
| 2012/0239976 A1 | 9/2012 | Cometti et al. |
| 2012/0259863 A1 | 10/2012 | Bodwin et al. |
| 2012/0275466 A1 | 11/2012 | Bhadra et al. |
| 2012/0278564 A1* | 11/2012 | Goss ....................... G06F 12/00 711/155 |
| 2012/0284574 A1 | 11/2012 | Avila et al. |
| 2012/0284587 A1 | 11/2012 | Yu et al. |
| 2013/0007073 A1 | 1/2013 | Varma |
| 2013/0007343 A1 | 1/2013 | Rub et al. |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0070527 A1 | 3/2013 | Sabbag et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1* | 5/2013 | Avila et al. ............... 365/185.11 |
| 2013/0132652 A1 | 5/2013 | Wood et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1* | 8/2013 | Mu et al. ................. 365/185.18 |
| 2013/0232289 A1 | 9/2013 | Zhong et al. |
| 2013/0238576 A1 | 9/2013 | Binkert et al. |
| 2013/0254507 A1* | 9/2013 | Islam .................. G06F 21/6218 711/166 |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1* | 11/2013 | Nachimuthu ....... G06F 12/0846 711/103 |
| 2013/0343131 A1 | 12/2013 | Wu et al. |
| 2013/0346672 A1 | 12/2013 | Sengupta et al. |
| 2014/0013188 A1 | 1/2014 | Wu et al. |
| 2014/0032890 A1 | 1/2014 | Lee et al. |
| 2014/0063905 A1 | 3/2014 | Ahn et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082459 A1* | 3/2014 | Li et al. .................. 714/773 |
| 2014/0095775 A1 | 4/2014 | Talagala et al. |
| 2014/0101389 A1 | 4/2014 | Nellans et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0258755 A1 | 9/2014 | Stenfort |
| 2014/0269090 A1* | 9/2014 | Flynn et al. ............. 365/185.19 |
| 2014/0310494 A1 | 10/2014 | Higgins et al. |
| 2014/0359381 A1 | 12/2014 | Takeuchi et al. |
| 2015/0023097 A1 | 1/2015 | Khoueir et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |

(56) References Cited

U.S. PATENT DOCUMENTS

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 | 6/2008 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Jul. 25, 2014 received in International Patent Application No. PCT/US2014/029453, which corresponds to U.S. Appl. No. 13/963,444, 9 pages (Frayer).
International Search Report and Written Opinion dated Mar. 7, 2014, received in International Patent Application No. PCT/US2013/074772, which corresponds to U.S. Appl. No. 13/831,218, 10 pages (George).
Interntional Search Report and Written Opinion dated March 24, 2014, received in International Patent Appiication No. PCT/US2013/074777, which corresponds to U.S. Appl. No. 13/831,308, 10 pages (George).
International Search Report and Written Opinion dated Mar. 7, 2014, received in International Patent Application No PCT/US2013/074779, which corresponds to U.S. Appl. No. 13/831,374, 8 pages (George).
Barr, Introduction to Watchdog Timers, Oct. 2001, 3 pgs.
Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/U52012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
Bayer, "Prefix B-Trees", ip.com Journal, ip.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf 13 pages.
Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Jul. 23, 2015, received in International Patent Application No. PCT/US2015/030850, which corresponds to U.S. Appl. No. 14/298,843, 12 pages (Ellis).
Invitation to Pay Additional Fees dated Feb. 13, 2015, received in International Patent Application No. PCT/US2014/063949, which corresponds to U.S. Appl. No. 14/135,433, 6 pages (Delpapa).

(56) References Cited

OTHER PUBLICATIONS

International Search Report and Written Opinion dated Jan. 21, 2015, received in International Application No. PCT/US2014/059748, which corresponds to U.S. Appl. No. 14/137,511, 13 pages (Dancho).

International Search Report and Written Opinion dated Feb. 18, 2015, received in International Application No. PCT/US2014/066921, which corresponds to U.S. Appl. No. 14/135,260, 13 pages (Fitzpatrick).

Lee et al., "A Semi-Preemptive Garbage Collector for Solid State Drives," Apr. 2011, IEEE, pp. 12-21.

Office Action dated Feb. 17, 2015, received in Chinese Patent Application No. 20121033498.1, which corresponds to U.S. Appl. No. 12/082,207, 9 pages (Prins).

International Search Report and Written Opinion dated Mar. 17, 2015, received in International Patent Application No. PCT/US2014/065987, which corresponds to U.S. Appl. No. 14/135,400, 12 pages (George).

International Search Report and Written Opinion dated Mar. 17, 2015, received in International Patent Application No. PCT/US2014/067467, which corresponds to U.S. Appl. No. 14/135,420, 13 pages (Lucas).

International Search Report and Written Opinion dated Apr. 20, 2015, received in International Patent Application No. PCT/US2014/063949, which corresponds to U.S. Appl. No. 14/135,433, 21 pages (Delpapa).

International Search Report and Written Opinion dated Mar. 9, 2015, received in International Patent Application No. PCT/US2014/059747, which corresponds to U.S. Appl. No. 14/137,440, 9 pages (Fitzpatrick).

Gasior, "Gigabyte's i-Ram storage device, Ram disk without the fuss," The Tech Report, p. 1, Jan. 25, 2006, 5 pages.

IBM Research-Zurich, "The Fundamental Limit of Flash Random Write Performance: Understanding, Analysis and Performance Modeling," Mar. 31, 2010, pp. 1-15.

International Search Report and Written Opinion dated Sep. 14, 2015, received in International Patent Application No. PCT/US2015/036807, which corresponds to U.S. Appl. No. 14/311,152, 9 pages (Higgins).

Oestreicher et al., "Object Lifetimes in Java Card," 1999, USENIX, 10 pages.

\* cited by examiner

SECURE ERASE IN A MEMORY DEVICE

RELATED APPLICATIONS

This application claims priority to U.S. Provisional Patent Application No. 61/897,782, filed Oct. 30, 2013, which is hereby incorporated by reference in its entirety.

TECHNICAL FIELD

The disclosed embodiments relate generally to memory systems, and in particular, to secure erase in a memory device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

In normal operations, as memory components fail, the failed memory components are replaced. In some cases, memory components are replaced on a scheduled maintenance interval. For example, dual in-line memory module (DIMM) devices may be routinely replaced. Traditionally, a DIMM device includes a series of dynamic random-access memory (DRAM) integrated circuits. DRAM is volatile memory since it loses its data quickly when power is removed, so no data remains on traditional DIMM devices when power is removed. However, for memory devices with non-volatile memory, data stored in the non-volatile memory remains stored when the memory devices are removed for service or replacement or in other situations unless measures are taken to erase the data stored in the non-volatile memory. Such measures may be appropriate when data security is desired or required.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable secure erase in a memory device. In one aspect, a secure erase operation is performed in accordance with a secure erase trigger.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
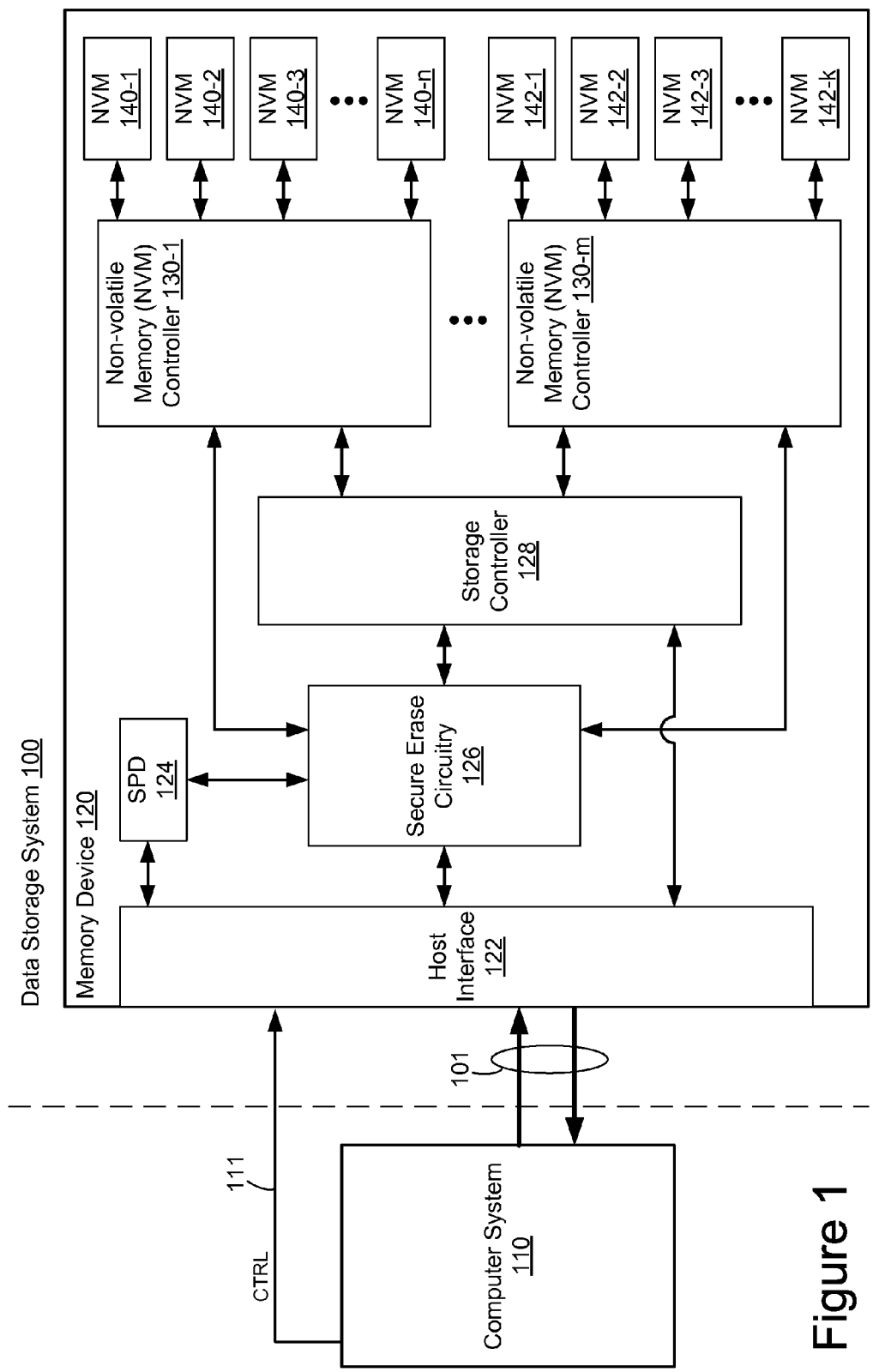
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable secure erase in a memory device. Some implementations include systems, methods and/or devices to perform a secure erase operation in accordance with a secure erase trigger.

More specifically, some implementations include a method of erasing data in a memory device. In some implementations, the method includes detecting a secure erase trigger. The method further includes determining a secure erase algorithm from among one or more secure erase algorithms to use in accordance with the detected secure erase trigger. The method further includes performing a secure erase operation in accordance with the selected secure erase algorithm, the secure erase operation including: (1) signaling a secure erase condition to a plurality of controllers on the memory device, (2) erasing one or more non-volatile memory devices on the memory device, (3) monitoring the secure erase operation, and (4) recording data related to the secure erase operation.

In some embodiments, the secure erase trigger includes a secure erase signal from a host system.

In some embodiments, the secure erase signal from the host system is communicated to the memory device through a double data rate (DDR) interface.

In some embodiments, the secure erase signal from the host system is communicated to the memory device through a Serial Presence Detect (SPD) interface.

In some embodiments, the secure erase trigger includes activation of a physical button on the memory device.

In some embodiments, the secure erase trigger is internally generated in the memory device when predefined criteria are satisfied, the predefined criteria including connection of the memory device to a new slot location.

In some embodiments, the secure erase trigger is internally generated in the memory device when predefined criteria are satisfied, the predefined criteria including failure to receive a command to preserve the memory device in a predetermined time period.

In some embodiments, the secure erase trigger is generated by a debug port associated with the memory device, wherein the debug port is password protected.

In some embodiments, the plurality of controllers on the memory device include a storage controller and one or more flash controllers, the one or more flash controllers coupled by the storage controller to a host interface of the memory device.

In some embodiments, the plurality of controllers on the memory device include at least one non-volatile storage controller and at least one other storage controller other than the at least one non-volatile storage controller.

In some embodiments, one of the plurality of controllers on the memory device maps double data rate (DDR) interface commands to serial advance technology attachment (SATA) interface commands.

In some embodiments, erasing one or more non-volatile memory devices on the memory device includes putting the memory device into a state that will erase the one or more non-volatile memory devices on the memory device the next time the memory device is powered up.

In some embodiments, performing a secure erase operation further includes preventing continued operation of the memory device by a host system.

In some embodiments, signaling the secure erase condition to the plurality of controllers on the memory device includes separately signaling the secure erase condition to each of the plurality of controllers.

In some embodiments, erasing one or more non-volatile memory devices on the memory device includes erasing a subset of flash memory devices associated with a flash controller of the plurality of controllers on the memory device.

In some embodiments, erasing one or more non-volatile memory devices on the memory device includes erasing all flash memory devices associated with a flash controller of the plurality of controllers on the memory device.

In some embodiments, erasing one or more non-volatile memory devices on the memory device includes erasing all flash memory devices associated with a subset of flash controllers of the plurality of controllers on the memory device.

In some embodiments, erasing one or more non-volatile memory devices on the memory device includes erasing all flash memory devices associated with all flash controllers of the plurality of controllers on the memory device.

In some embodiments, erasing one or more non-volatile memory devices on the memory device includes erasing the one or more non-volatile memory devices in a predefined sequence.

In some embodiments, the predefined sequence is programmable.

In some embodiments, the method further includes blocking host data from being preserved in response to a data hardening event while performing the secure erase operation. For example, in some embodiments, the method includes, in response to a data hardening event that occurs after initiation but prior to completion of the secure erase operation, saving metadata but not host data for the portions of memory to be erased by the secure erase operation.

In some embodiments, erasing one or more non-volatile memory devices on the memory device includes preserving at least predefined portions of metadata (e.g., usage metrics indicating or corresponding to cumulative usage or remaining endurance, maintained for respective portions (e.g., blocks, superblocks, or other storage units) of the non-volatile memory devices) on the memory device, while host data stored in the one or more non-volatile memory devices on the memory device is erased.

In some embodiments, the method further includes (1) prior to performing the secure erase operation, determining whether a variable is set to prevent the secure erase operation, and (2) in accordance with a determination that the variable is set, preventing performance of the secure erase operation.

In some embodiments, the variable is password protected, thereby preventing modification of the variable's value except in accordance with the provision of a password matching a previously established password.

In some embodiments, the non-volatile memory comprises one or more flash memory devices.

In some embodiments, the memory device includes a dual in-line memory module (DIMM) device.

In another aspect, any of the methods described above are performed by a memory device including (1) an interface for coupling the memory device to a host system, (2) a plurality of controllers (e.g., including a storage controller and one or more flash controllers), and (3) secure erase circuitry including one or more processors, the secure erase circuitry configured to perform or control performance of any of the methods described above.

In yet another aspect, any of the methods described above are performed by a memory device operable to erase data. In some embodiments, the device includes (1) an interface for coupling the memory device to a host system, (2) means for detecting a secure erase trigger, (3) means for determining a secure erase algorithm from among one or more secure erase algorithms to use in accordance with the detected secure erase trigger, and (4) means for performing a secure erase operation in accordance with the selected secure erase algorithm, the means for performing the secure erase operation including: (a) means for signaling a secure erase condition to a plurality of controllers on the memory device, (b) means for erasing one or more non-volatile memory devices on the memory device, (c) means for monitoring the secure erase operation, and (d) means for recording data related to the secure erase operation.

In yet another aspect, a non-transitory computer readable storage medium stores one or more programs for execution by one or more processors of a memory device having a plurality of controllers and secure erase circuitry, the one or more programs including instructions for performing any of the methods described above.

In some embodiments, the non-transitory computer readable storage medium includes a non-transitory computer readable storage medium associated with each of the plurality of controllers on the memory device and a non-transitory computer readable storage medium associated with the secure erase circuitry.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes memory device 120 (sometimes herein called a storage device, information storage device, or data storage device), which includes host interface 122, serial presence detect (SPD) device 124, secure erase circuitry 126, storage controller 128 (sometimes herein called a memory controller), one or more non-volatile memory (NVM) controllers 130 such as flash controllers, and non-volatile memory (NVM) (e.g., one or more NVM device(s) 140, 142 such as one or more flash memory devices), and is used in conjunction with computer system 110. In some implementations, memory device 120 includes a single flash memory device while in other implementations memory device 120 includes a plurality of flash memory devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to memory device 120 through data connections 101. However, in some implementations computer system 110 includes memory device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to memory device 120. In some implementations, computer system 110 is a server system, such as a server system in a data center, and does not have a display and other user interface components.

In some implementations, memory device 120 includes NVM devices 140, 142 such as flash memory devices (e.g., NVM devices 140-1 through 140-n and NVM devices 142-1 through 142-k) and NVM controllers 130 such as flash controllers (e.g., NVM controllers 130-1 through 130-m). In some implementations, each NVM controller of NVM controllers 130 includes one or more processing units (also sometimes called CPUs or processors or microprocessors or microcontrollers) configured to execute instructions in one or more programs (e.g., in NVM controllers 130). In some implementations, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments memory device 120 includes other non-volatile memory device(s) and corresponding non-volatile storage controller(s).

In some implementations, memory device 120 also includes host interface 122, SPD device 124, secure erase circuitry 126, and storage controller 128. Memory device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some implementations, secure erase circuitry 126 includes one or more processing units (also sometimes called CPUs or processors or microprocessors or microcontrollers) configured to execute instructions in one or more programs (e.g., in secure erase circuitry 126). In some implementations, the one or more processors and the one or more programs executed by the one or more processors of secure erase circuitry 126 are used to perform functions beyond the function of securely erasing data. Secure erase circuitry 126 is sometimes herein called a supervisory controller or SPD/supervisory controller. Secure erase circuitry 126 is coupled to host interface 122, SPD device 124, storage controller 128, and NVM controllers 130 in order to coordinate the operation of these components, including supervising and controlling functions such as secure erase, data logging, and other aspects of managing functions on memory device 120.

Storage controller 128 is coupled to host interface 122, secure erase circuitry 126, and NVM controllers 130. In some implementations, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other implementations, the device interface used by storage controller 128 to communicate with NVM controllers 130 is SAS (serial attached SCSI), or other storage interface. In some implementations, storage controller 128 includes one or more processing units (also sometimes called CPUs or processors or microprocessors or microcontrollers) configured to execute instructions in one or more programs (e.g., in storage controller 128). In some implementations, the one or more processors are shared by one or more components within, and in some cases, beyond the function of storage controller 128.

SPD device 124 is coupled to host interface 122 and secure erase circuitry 126. Serial presence detect (SPD) refers to a standardized way to automatically access information about a computer memory module (e.g., memory device 120). For example, information about the type of the device (e.g., where the device type is one of a predefined set of device types), and the storage capacity of the device can be communicated with a host system (e.g., computer system 110) through SPD device 124. In another example, if the memory module has a failure, the failure can be communicated with a host system (e.g., computer system 110) through SPD device 124.

In some embodiments, SPD device 124 is a non-volatile memory device used to store data associated with secure erase circuitry 126. For example, in some embodiments, SPD device 124 stores data that indicates which events can trigger a secure erase operation (e.g., a host command, a change in slot location within a host, etc.), erase sequencing lists (e.g., for use in limited peak power usage), trigger matching codes (e.g., used as a key to allow secure erase operations), and/or other data associated with secure erase circuitry 126. Further, in some embodiments, SPD device 124 is used to record data related to a secure erase operation. For example, in some implementations, SPD device 124 records (1) a timestamp or other time value that indicates or represents the time (e.g., a real time clock value) when a secure erase operation was triggered (or requested or generated) (e.g., Thursday, Oct. 17, 2013, at 12:03:17 AM), (2) current status of the request to perform the secure erase operation, (3) current completion status of the secure erase operation, (4) reason for the secure erase operation (e.g., what type of secure erase trigger was detected), (5) the length of time the secure erase operation took to complete, and/or (6) other information regarding the secure erase operation.

Figure 2:
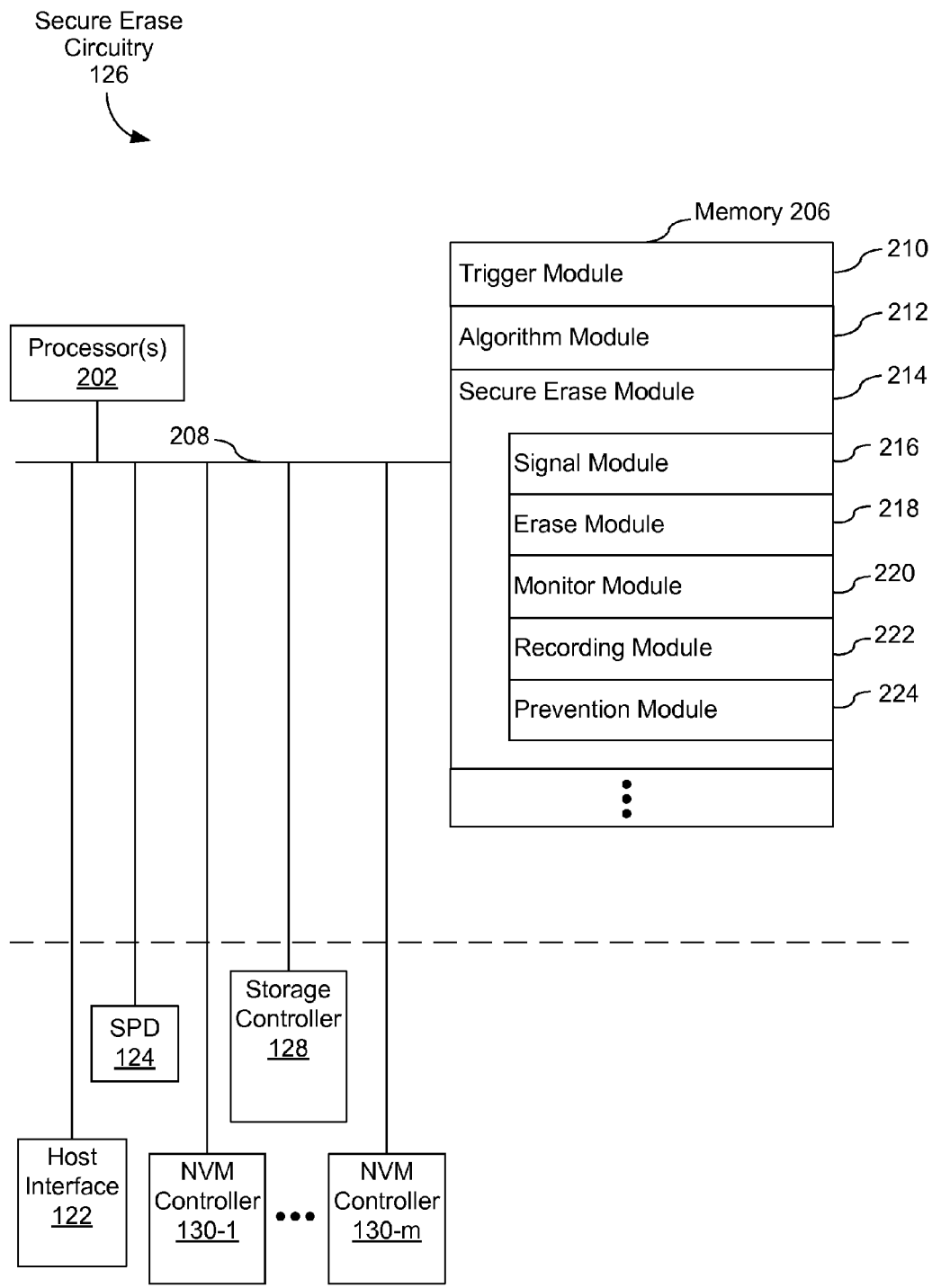
FIG. 2 is a block diagram illustrating an implementation of secure erase circuitry, in accordance with some embodiments.

FIG. 2 is a block diagram illustrating an implementation of secure erase circuitry 126, in accordance with some embodiments. Secure erase circuitry 126 typically includes one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Secure erase circuitry 126 is coupled to host interface 122, SPD device 124, storage controller 128, and NVM controllers 130 (e.g., NVM controllers 130-1 through 130-*m*) by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- a trigger module 210 that is used for detecting a secure erase trigger or internally generating a secure erase trigger;
- an algorithm module 212 that is used for determining a secure erase algorithm from among one or more secure erase algorithms to use for a secure erase operation; and
- a secure erase module 214 that is used for performing a secure erase operation in accordance with the selected secure erase algorithm.

In some embodiments, memory 206, or the computer readable storage medium of memory 206 further stores a configuration module for configuring memory device 120 and secure erase circuitry 126, and/or configuration values (such as one or more predefined sequences for a secure erase operation) for configuring secure erase circuitry 126, neither of which is explicitly shown in FIG. 2. In some implementations, upon power up and upon reset, the configuration module automatically sets the values of one or more configuration parameters of memory device 120 (and, optionally, determines which of two or more secure erase modules, etc. to use) in accordance with the components of memory device 120 (e.g., the type of non-volatile memory components in memory device 120) and/or characteristics of the data storage system 100 that includes memory device 120.

In some embodiments, the secure erase module 214 optionally includes the following modules or sub-modules, or a subset thereof:

- a signal module 216 that is used for signaling a secure erase condition to a plurality of controllers on the memory device (e.g., storage controller 128 and NVM controllers 130, FIG. 1);
- optionally, an erase module 218 that is used for erasing one or more non-volatile memory devices (e.g., NVM devices 140, 142, FIG. 1) on the memory device;
- a monitor module 220 that is used for monitoring the secure erase operation;
- a recording module 222 that is used for recording data related to the secure erase operation; and
- a prevention module 224 that is used for preventing one or more activities (e.g., host commands, data hardening events, and/or the secure erase operation).

In some embodiments, secure erase module 214 does not include an erase module 218, and instead each of the NVM controllers 130 has an erase module (e.g., erase module 414, FIG. 4) that it executes in order to erase data in one or more non-volatile memory devices in response to detecting a signal from secure erase circuitry 126 that signals a secure erase condition.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 5A-5E.

Although FIG. 2 shows secure erase circuitry 126, FIG. 2 is intended more as a functional description of the various features which may be present in secure erase circuitry than as a structural schematic of the embodiments described herein. In practice, and as recognized by those of ordinary skill in the art, items shown separately could be combined and some items could be separated.

Figure 3:
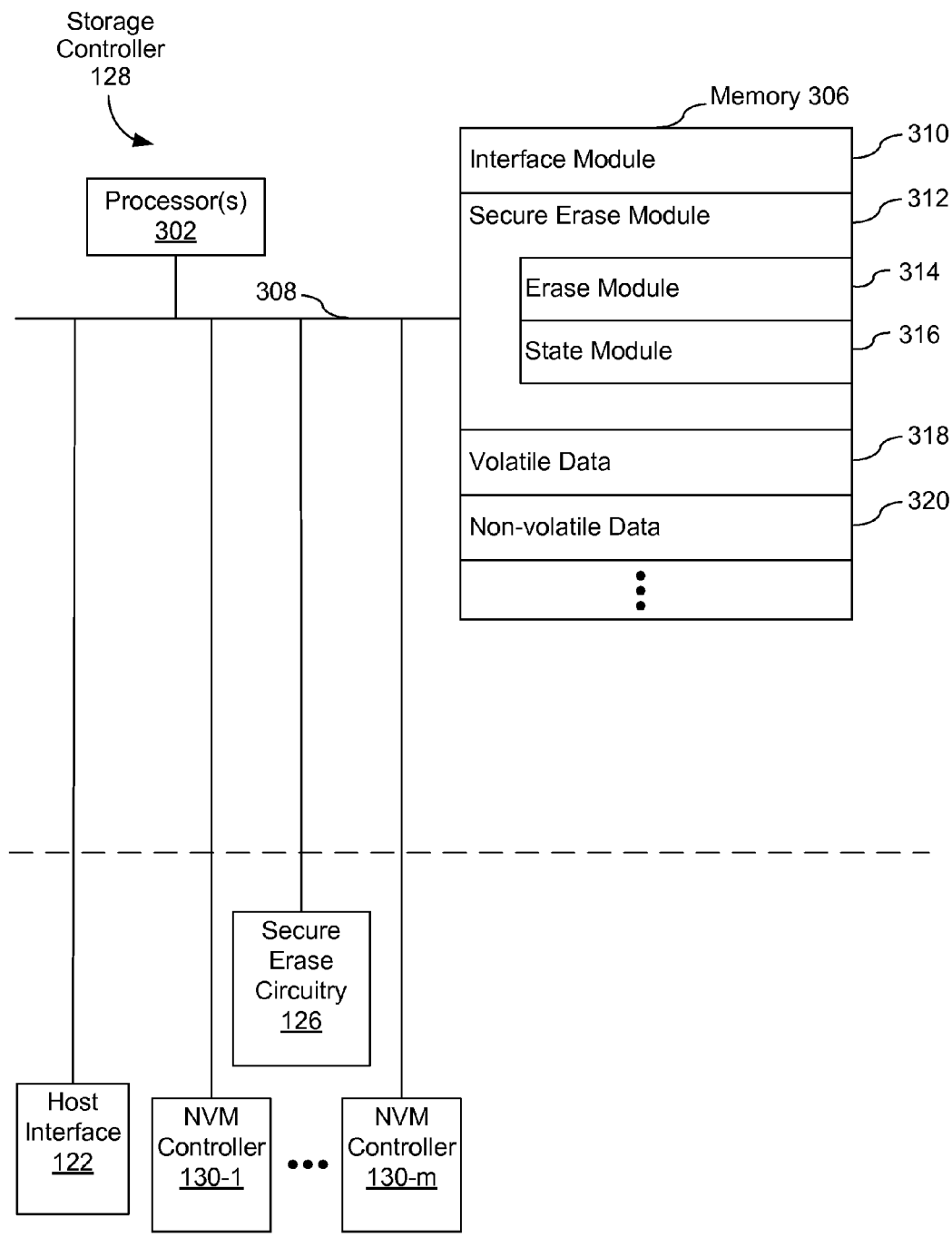
FIG. 3 is a block diagram illustrating an implementation of a storage controller, in accordance with some embodiments.

FIG. 3 is a block diagram illustrating an implementation of a storage controller 128, in accordance with some embodiments. Storage controller 128 typically includes one or more processors (also sometimes called CPUs or processing units or microprocessors or microcontrollers) 302 for executing modules, programs and/or instructions stored in memory 306 and thereby performing processing operations, memory 306, and one or more communication buses 308 for interconnecting these components. Communication buses 308 optionally include circuitry (sometimes called a chipset) that interconnects and controls communications between system components. Storage controller 128 is coupled to host interface 122, secure erase circuitry 126, and NVM controllers 130 (e.g., NVM controllers 130-1 through 130-*m*) by communication buses 308. Memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 306 optionally includes one or more storage devices remotely located from processor(s) 302. Memory 306, or alternately the non-volatile memory device(s) within memory 306, comprises a non-transitory computer readable storage medium. In some embodiments, memory 306, or the computer readable storage medium of memory 306 stores the following programs, modules, and data structures, or a subset thereof:

an interface module 310 that is used for communicating with other components, such as host interface 122, secure erase circuitry 126, and NVM controllers 130;

optionally, a secure erase module 312 that is used for performing a secure erase operation;

volatile data 318, including volatile data associated with storage controller 128; and non-volatile data 320, including non-volatile data associated with storage controller 128.

In some embodiments, the secure erase module 312, if provided, includes the following modules or sub-modules, or a subset thereof:

an erase module 314 that is used for instructing the one or more non-volatile storage controllers (e.g., NVM controllers 130, FIG. 1) to erase one or more non-volatile memory devices (e.g., NVM devices 140, 142, FIG. 1) on the memory device; and a state module 316 that is used for maintaining one or more state variables (e.g., indicating status of a secure erase operation).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above. In some embodiments, the programs, modules, and data structures stored in memory 306, or the computer readable storage medium of memory 306, provide instructions for implementing respective operations in the methods described below with reference to FIGS. 5A-5E.

Although FIG. 3 shows a storage controller 128, FIG. 3 is intended more as a functional description of the various features which may be present in a storage controller than as a structural schematic of the embodiments described herein. In practice, and as recognized by those of ordinary skill in the art, items shown separately could be combined and some items could be separated.

Figure 4:
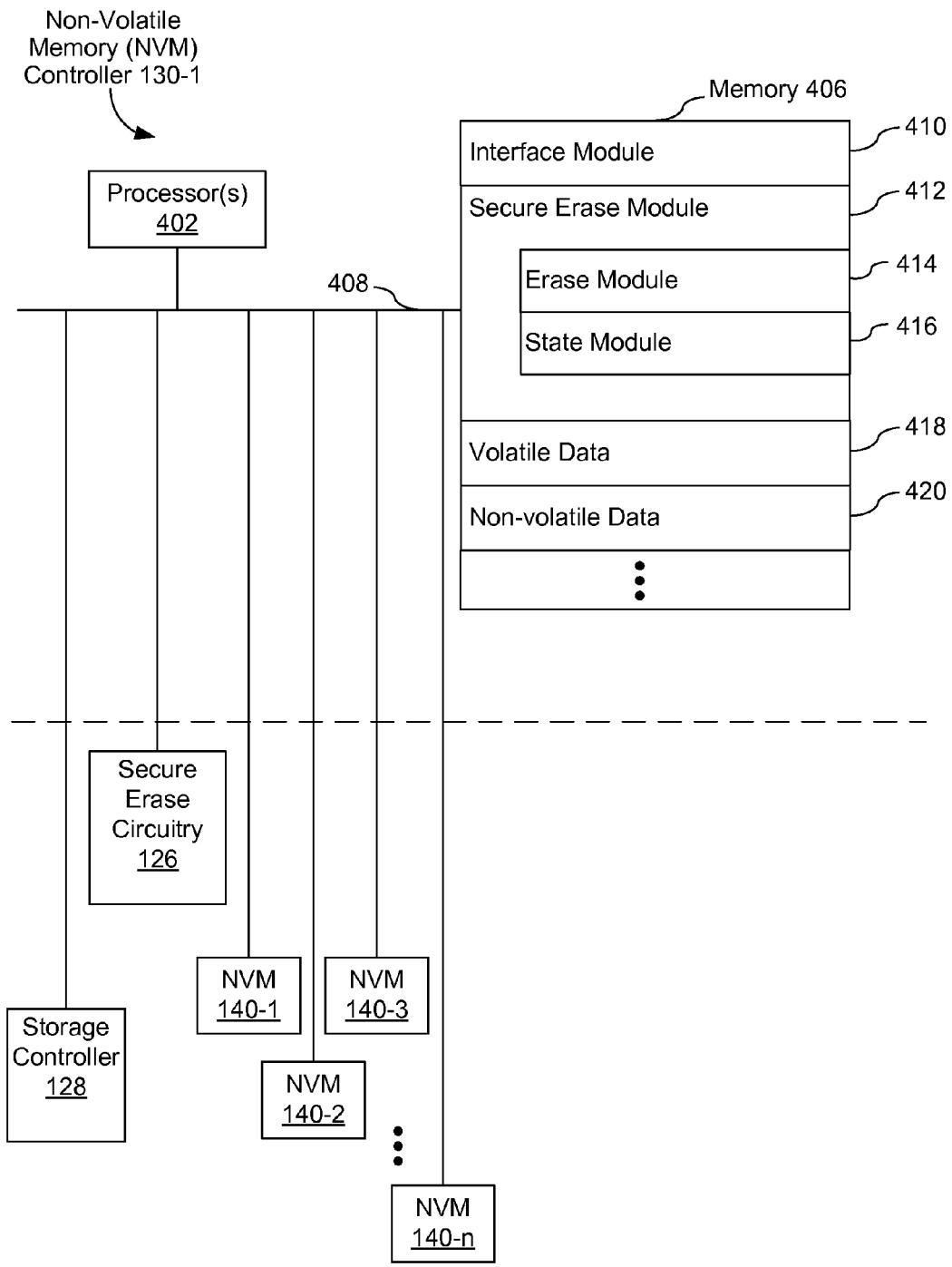
FIG. 4 is a block diagram illustrating an implementation of a non-volatile memory (NVM) controller, in accordance with some embodiments.
Figure 5A:
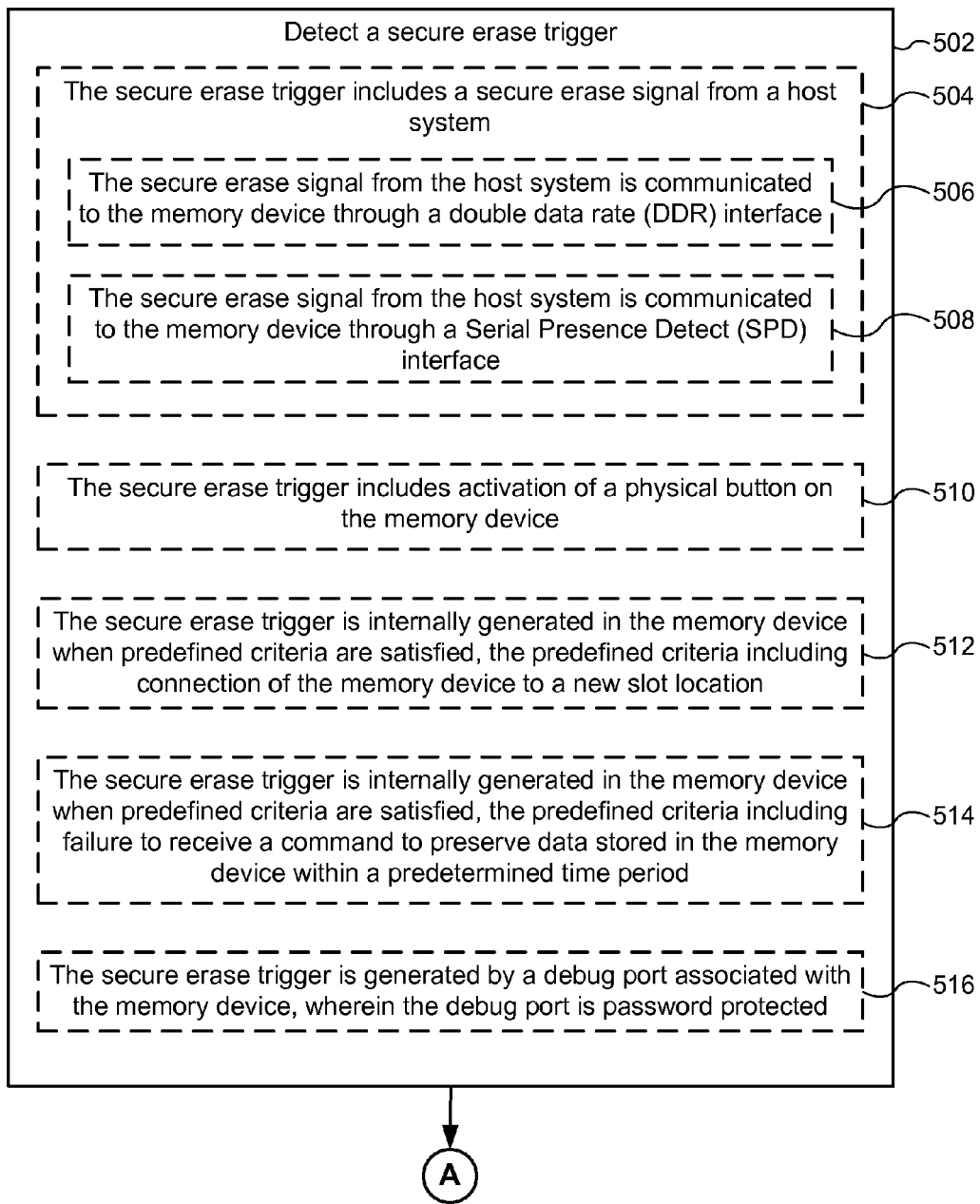
FIGS. 5A-5E illustrate a flowchart representation of a method of erasing data in a memory device, in accordance with some embodiments.
Figure 5B:
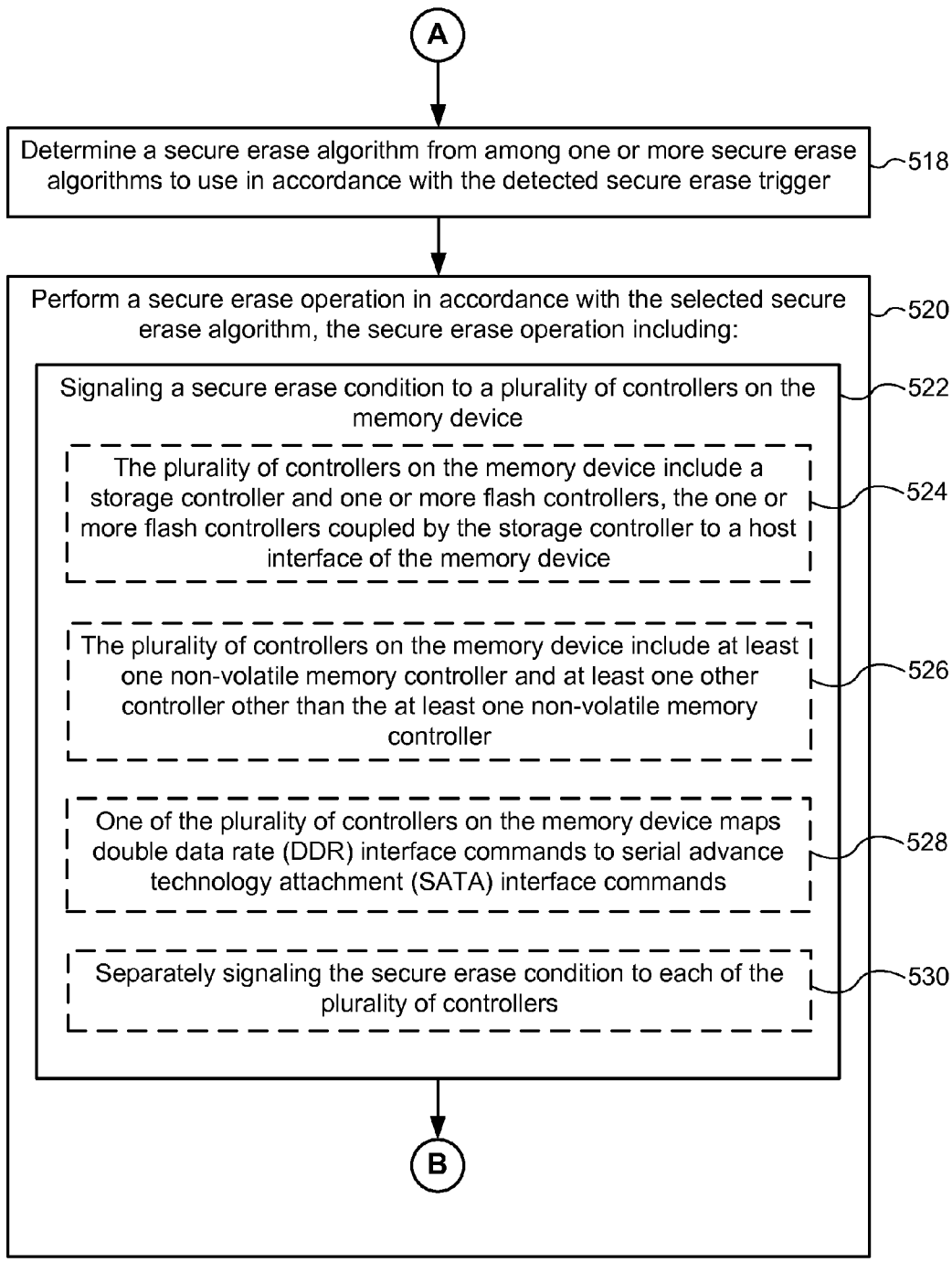
Figure 5C:
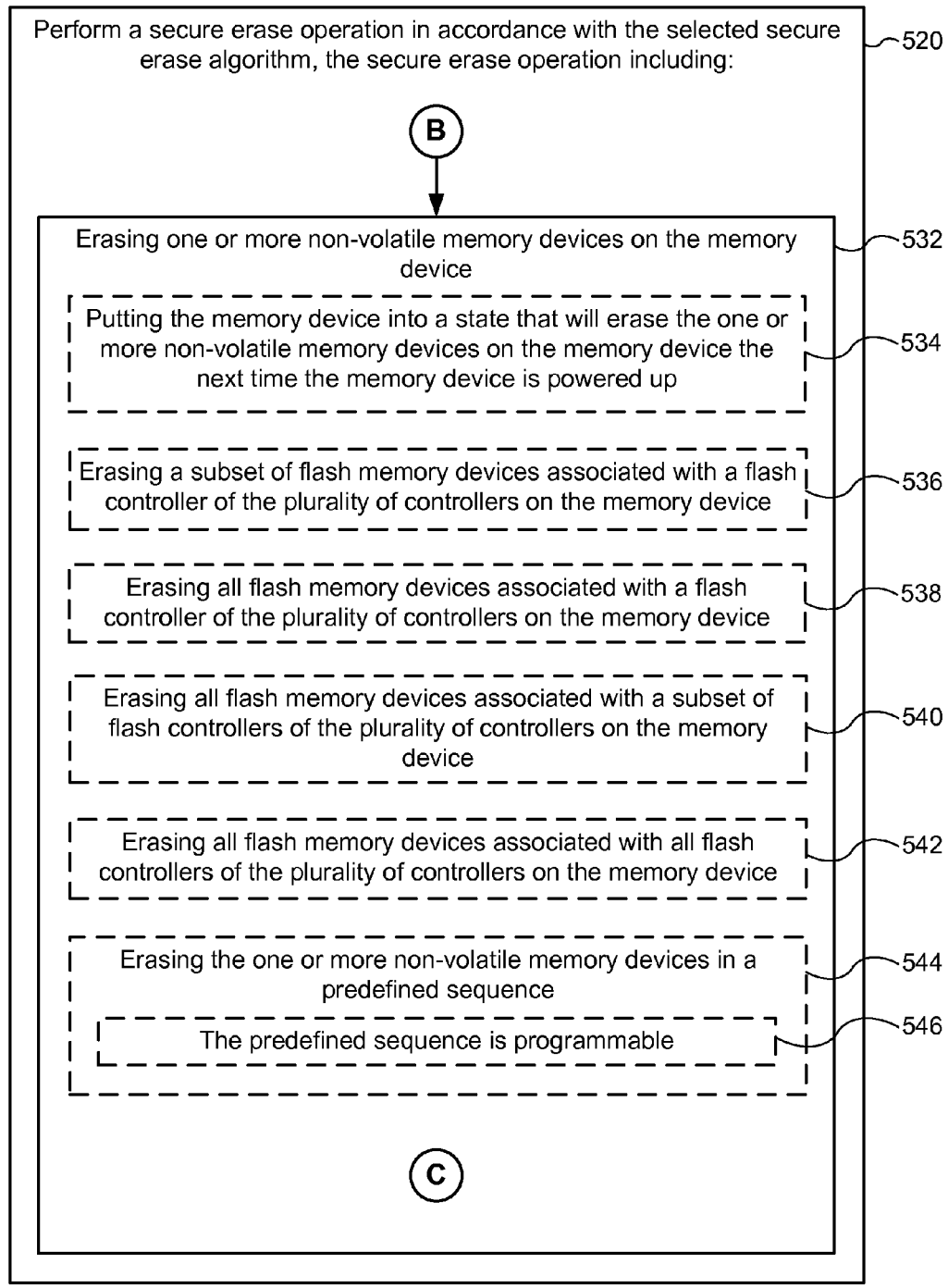
Figure 5D:
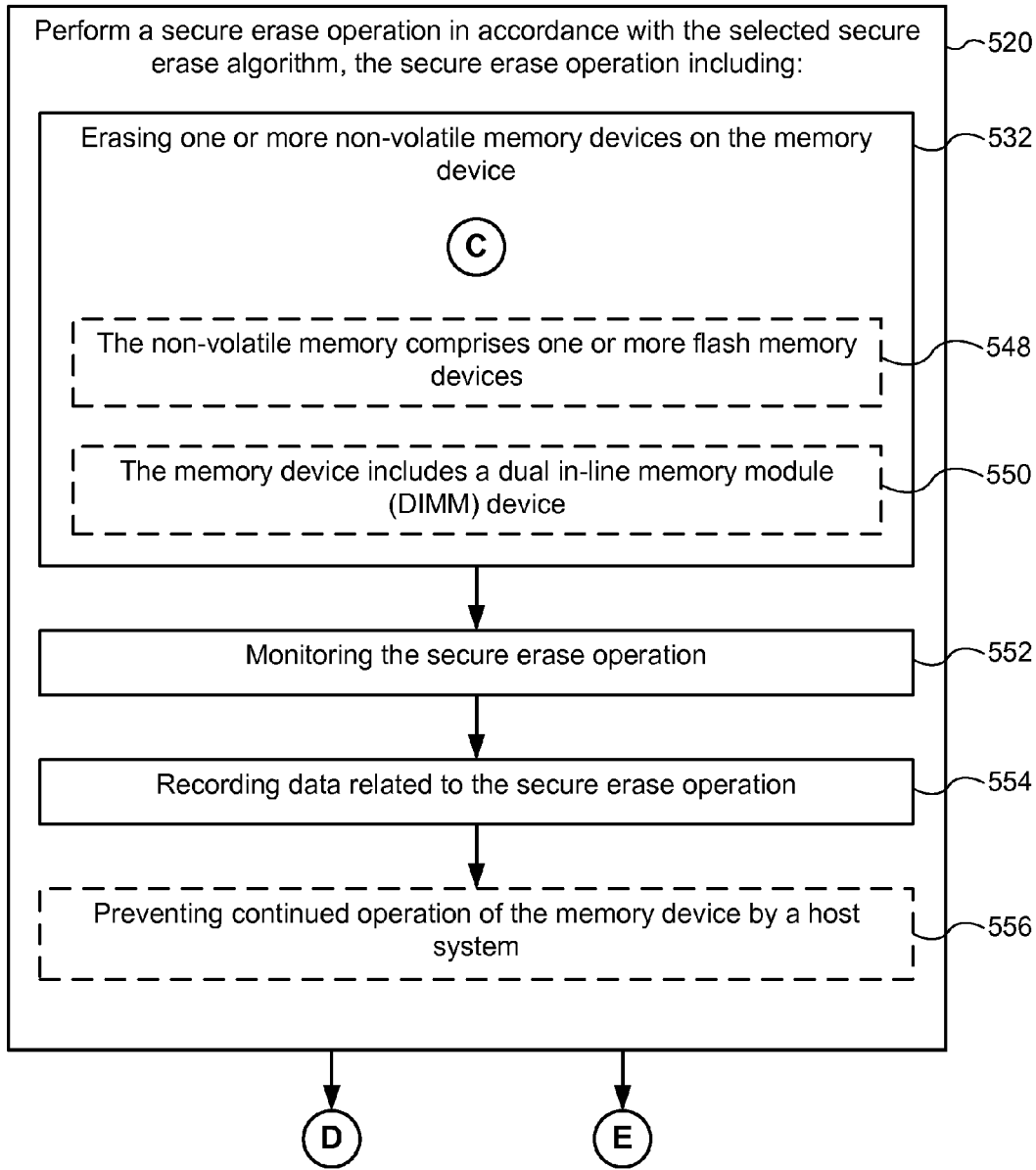
Figure 5E:
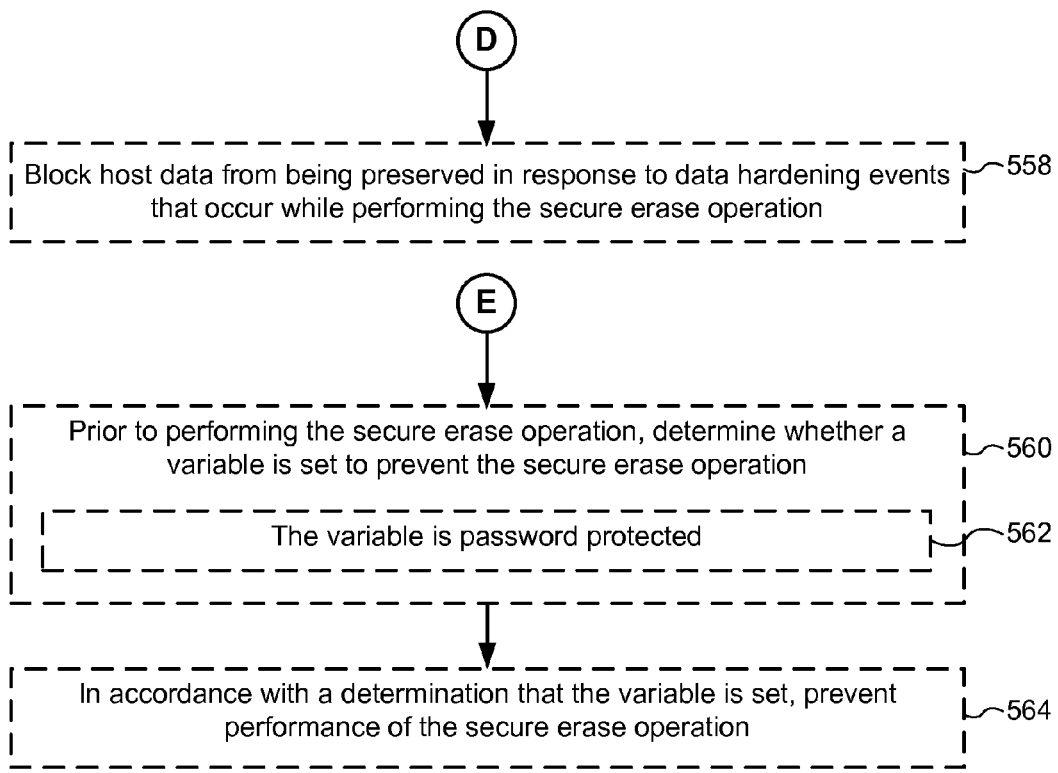

FIG. 4 is a block diagram illustrating an implementation of a non-volatile memory (NVM) controller 130-1, in accordance with some embodiments. NVM controller 130-1 typically includes one or more processors (also sometimes called CPUs or processing units or microprocessors or microcontrollers) 402 for executing modules, programs and/or instructions stored in memory 306 and thereby performing processing operations, memory 406, and one or more communication buses 408 for interconnecting these components. Communication buses 408 optionally include circuitry (sometimes called a chipset) that interconnects and controls communications between system components. NVM controller 130-1 is coupled to storage controller 128, secure erase circuitry 126, and NVM devices 140 (e.g., NVM devices 140-1 through 140-*n*) by communication buses 408. Memory 406 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 406 optionally includes one or more storage devices remotely located from processor(s) 402. Memory 406, or alternately the non-volatile memory device(s) within memory 406, comprises a non-transitory computer readable storage medium. In some embodiments, memory 406, or the computer readable storage medium of memory 406 stores the following programs, modules, and data structures, or a subset thereof:

an interface module 410 that is used for communicating with other components, such as storage controller 128, secure erase circuitry 126, and NVM devices 140;

a secure erase module 412 that is used for performing a secure erase operation;

volatile data 418, including volatile data associated with NVM controller 130-1; and non-volatile data 420, including non-volatile data associated with NVM controller 130-1.

In some embodiments, the secure erase module 412 optionally includes the following modules or sub-modules, or a subset thereof:

an erase module 414 that is used for erasing one or more non-volatile memory devices (e.g., NVM devices 140-1 through 140-*n*) on the memory device; and a state module 416 that is used for maintaining one or more state variables (e.g., indicating status of a secure erase operation).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above. In some embodiments, the programs, modules, and data structures stored in memory 406, or the computer readable storage medium of memory 406, provide instructions for implementing respective operations in the methods described below with reference to FIGS. 5A-5E.

Although FIG. 4 shows a NVM controller 130-1, FIG. 4 is intended more as a functional description of the various features which may be present in a NVM controller than as a structural schematic of the embodiments described herein. In practice, and as recognized by those of ordinary skill in the art, items shown separately could be combined and some items could be separated. Further, although FIG. 4 shows a NVM controller 130-1, the description of FIG. 4 similarly applies to other NVM controllers (e.g., NVM controllers 130-2 through 130-*m*) in memory device 120 (FIG. 1).

FIGS. 5A-5E illustrate a flowchart representation of a method 500 of erasing data in a memory device, in accordance with some embodiments. A memory device (e.g., memory device 120, FIG. 1) coordinates and manages multiple sub-system components to erase data, which initiates performance of method 500. At least in some implementations, method 500 is performed by a memory device (e.g., memory device 120, FIG. 1) or one or more components of the memory device (e.g., secure erase circuitry 126, storage controller 128, and/or NVM controllers 130, FIG. 1). In some embodiments, method 500 is governed by instructions that are stored in a non-transitory computer readable storage medium and that are executed by one or more processors of a device, such as the one or more processors 202 of secure erase circuitry 126, the one or more processors 302 of storage controller 128, and/or the one or more processors 402 of NVM controllers 130, as shown in FIGS. 2-4.

A memory device (e.g., memory device 120, FIG. 1) detects (502) a secure erase trigger. In some embodiments, or in some circumstances, the memory device receives the secure erase trigger from a source external to the memory device (e.g., from a host system), as described in more detail below. In other embodiments, or in other circumstances, the memory device receives the secure erase trigger from a source internal to the memory device and/or the secure erase trigger is internally generated in the memory device, as described in more detail below. As discussed above, in some embodiments, the memory device stores data (e.g., in SPD device 124, FIG. 1) that indicates which events can trigger a secure erase operation. Thus, in some configurations, one subset of events will cause a secure erase trigger, while in other configurations another subset of events will cause a secure erase trigger. For example, in one configuration a regular (not password-protected) host command can be used to trigger a secure erase operation, while in another configuration that same host command is blocked from triggering a secure erase operation. In another example, in one configuration a secure erase operation is triggered by detection (by the memory device) that the memory device has powered up in a different memory slot than the memory slot in which it was previously located, while in another configuration, detection of that condition does not trigger a secure erase operation. In some embodiments, programmable data stored in non-volatile memory (e.g., in SPD device 124, FIG. 1) provides control over allowable trigger types. In some implementations, a trigger module (e.g., trigger module 210, FIG. 2) is used to detect a secure erase trigger, as described above with respect to FIG. 2.

In some embodiments, the secure erase trigger includes (504) a secure erase signal from a host system (e.g., computer system 110, FIG. 1). In some implementations, the secure erase signal from the host system is (506) communicated to the memory device through a double data rate (DDR) interface (e.g., the memory device is coupled to the host system by a DDR interface compliant with an interface standard for DDR DRAM devices). In some implementations, the secure erase signal from the host system is (508) communicated to the memory device through a Serial Presence Detect (SPD) interface.

In some embodiments, the secure erase trigger includes (510) activation of a physical button on the memory device. For example, in some implementations, a user presses a physical button on the memory device (e.g., memory device 120, FIG. 1) to generate the secure erase trigger.

In some embodiments, the secure erase trigger is (512) internally generated in the memory device (e.g., memory device 120, FIG. 1) when predefined criteria are satisfied, the predefined criteria including connection of the memory device to a new slot location. In some implementations, via the Serial Presence Detect (SPD) interface, position information (e.g., slot location in a host system) can be obtained and used as a secure erase trigger if the slot location is different from the slot location during the last boot operation. For example, the memory device may be in slot number 17 out of 64 slots in the host system (e.g., computer system 110, FIG. 1), and the secure erase trigger is internally generated in the memory device when the memory device is connected to a new slot location (e.g., a slot location other than slot number 17 in the host system, or a slot location in another host system). In some implementations, a trigger module (e.g., trigger module 210, FIG. 2) is used to internally generate the secure erase trigger when predefined criteria are satisfied, the predefined criteria including connection of the memory device to a new slot location, as described above with respect to FIG. 2.

In some embodiments, the secure erase trigger is (514) internally generated in the memory device (e.g., memory device 120, FIG. 1) when predefined criteria are satisfied, the predefined criteria including failure to receive a command to preserve data stored in the memory device within a predetermined time period. In some embodiments, a "watch dog" system automatically erases data stored in the memory device (e.g., by internally generating the secure erase trigger) if a boot command to preserve data stored in the memory device is not issued by the host at system startup. In some embodiments, a "watch dog" system automatically erases data stored in the memory device (e.g., by internally generating the secure erase trigger) if a command to preserve the memory is not received every predetermined time period (e.g., every 24 hours). In some implementations, a trigger module (e.g., trigger module 210, FIG. 2) is used to internally generate the secure erase trigger when predefined criteria are satisfied, the predefined criteria including failure to receive a command to preserve data stored in the memory device within a predetermined time period, as described above with respect to FIG. 2.

In some embodiments, the secure erase trigger is (516) generated by a debug port associated with the memory device (e.g., memory device 120, FIG. 1), and the debug port is password protected. In some embodiments, the debug port is password protected and generates a secure erase trigger if a user enters (e.g., sends to the debug port of the memory device) a predefined password (e.g., enters a password that matches a predefined password, which optionally a special "erase" password used to enable the issuance of the secure erase trigger) and a predefined "erase" command.

Next, after the memory device (e.g., memory device 120, FIG. 1) detects (502) a secure erase trigger, the memory device determines (518) a secure erase algorithm from among one or more secure erase algorithms to use in accordance with the detected secure erase trigger. In some embodiments, the one or more secure erase algorithms include algorithms to overwrite a storage medium with specific overwrite patterns and optionally, with multiple passes (repeated erase operations on the same memory locations). In some embodiments, the one or more secure erase algorithms include applying a high energy impulse to destroy the one or more non-volatile memory devices on the memory device. In some embodiments, the one or more secure erase algorithms include other types of secure erase procedures. In some implementations, the one or more secure erase algorithms are stored in secure erase circuitry (e.g., secure erase circuitry 126, FIG. 1) and in controllers (e.g., NVM controllers 130, FIG. 1, and optionally storage controller 128), and are selected in accordance with the detected secure erase trigger, allowing one or more different secure erase procedures to be performed on the memory device. In some implementations, an algorithm module (e.g., algorithm module 212, FIG. 2) is used to determine a secure erase algorithm from among one or more secure erase algorithms to use in accordance with the detected secure erase trigger, as described above with respect to FIG. 2.

Next, the memory device performs (520) a secure erase operation in accordance with the selected secure erase algorithm. For example, if it was determined in operation 518 to use a first secure erase algorithm in accordance with the detected secure erase trigger, then the memory device performs a secure erase operation in accordance with the first secure erase algorithm. In some implementations, a secure erase module (e.g., secure erase module 214, FIG. 2) in secure erase circuitry (e.g., secure erase circuitry 126, FIGS. 1 and 2) and/or a secure erase module on one or more controllers (e.g., secure erase module 312 in storage controller 128, FIG. 3 and/or secure erase module 412 in NVM controller 130, FIG. 4) are used to perform a secure erase operation in accordance with the selected secure erase algorithm, as described above with respect to FIGS. 2-4.

First, the secure erase operation includes (520) signaling (522) a secure erase condition to a plurality of controllers on the memory device (e.g., storage controller 128 and NVM controllers 130, FIG. 1). In some implementations, a signal module (e.g., signal module 216, FIG. 2) is used to signal a secure erase condition to a plurality of controllers on the memory device, as described above with respect to FIG. 2.

In some embodiments, the plurality of controllers on the memory device include (524) a storage controller (e.g., storage controller 128, FIG. 1) and one or more flash controllers (e.g., NVM controllers 130, FIG. 1), the one or more flash controllers coupled by the storage controller to a host interface (e.g., host interface 122, FIG. 1) of the memory device.

In some embodiments, the plurality of controllers on the memory device include (526) at least one non-volatile storage controller and at least one other controller other than the at least one non-volatile storage controller. In some implementations, the at least one non-volatile storage controller is a flash controller (e.g., NVM controller 130-1, FIG. 1). In other implementations, the at least one non-volatile storage controller controls one or more other types of non-volatile memory devices.

In some embodiments, one of the plurality of controllers on the memory device maps (528) double data rate (DDR) interface commands to serial advance technology attachment (SATA) interface commands. For example, a storage controller (e.g., storage controller 128, FIG. 1) maps double data rate type three (DDR3) interface commands to SATA interface commands. In some implementations, a storage controller (e.g., storage controller 128, FIG. 1) uses a defined interface standard, such as DDR3, to communicate with a host interface (e.g., host interface 122, FIG. 1) and uses a defined interface standard, such as SATA, to communicate with other controllers on the memory device (e.g., NVM controllers 130, FIG. 1).

In some embodiments, signaling (522) the secure erase condition to the plurality of controllers on the memory device includes separately signaling (530) the secure erase condition to each of the plurality of controllers (e.g., storage controller 128, NVM controller 130-1, . . . , NVM controller **130-*m*, FIG. 1). In some implementations, individual secure erase signals to each of the plurality of controllers allow for sequential sequencing of the secure erase operation across the plurality of controllers, parallel performance of the secure erase operation across the plurality of controllers, or a combination of sequential and parallel sequencing for the secure erase operation. In a non-limiting example of a sequential sequence, the secure erase operation for a first NVM controller (e.g., NVM controller 130-1, FIG. 1) will be performed prior in time, or started prior in time, to the secure erase operation for a second NVM controller (e.g., NVM controller 130-*m*, FIG. 1). Further, in a non-limiting example of a combination of sequential and parallel sequences, the secure erase operations of two or more NVM controllers (e.g., NVM controller 130-1 and NVM controller 130-2, FIG. 1) are performed simultaneously, while the secure erase operation for another NVM controller (e.g., NVM controller 130-*m*, FIG. 1) is performed prior to, or started prior to, the parallel secure erase operation of the aforementioned NVM controllers. In some implementations, a signal module (e.g., signal module 216, FIG. 2) is used to separately signal the secure erase condition to each of the plurality of controllers, as described above with respect to FIG. 2**.

Next, the secure erase operation includes (520) erasing (532) one or more non-volatile memory devices (e.g., NVM devices 140, 142, FIG. 1) on the memory device (e.g., memory device 120, FIG. 1). In some implementations, an erase module of the secure erase circuitry and/or an erase module of the one or more controllers (e.g., erase module 218, FIG. 2, erase module 314, FIG. 3, and/or erase module 414, FIG. 4) are used to erase one or more non-volatile memory devices on the memory device, as described above with respect to FIGS. 2-4.

In some embodiments, erasing (532) one or more non-volatile memory devices on the memory device includes putting (534) the memory device into a state that will erase the one or more non-volatile memory devices (e.g., NVM devices 140, 142, FIG. 1) on the memory device the next time the memory device is powered up. In some implementations, the memory device records the state in non-volatile memory associated with the secure erase circuitry (e.g., in SPD device 124, FIG. 1) and/or in non-volatile memory associated with one or more controllers (e.g., in non-volatile data 320 of storage controller 128, FIG. 3, and/or in non-volatile data 420 of NVM controller 130, FIG. 4). In some embodiments, for example, if the memory device is powered off during the secure erase operation, after the memory device powers back up, the memory device disallows host commands and continues erasing the one or more non-volatile memory devices. In some implementations, an erase module of the secure erase circuitry and/or an erase module of one or more controllers (e.g., erase module 218, FIG. 2, erase module 314, FIG. 3, and/or erase module 414, FIG. 4) are used to put the memory device into a state that will erase the one or more non-volatile memory devices on the memory device the next time the memory device is powered up, as described above with respect to FIGS. 2-4. In some implementations, state modules on one or more controllers (e.g., state module 316, FIG. 3 and/or state module 416, FIG. 4) are used to maintain one or more state variables (e.g., indicating status of the secure erase operation), as described above with respect to FIGS. 3-4.

In some embodiments, erasing (532) one or more non-volatile memory devices on the memory device includes erasing (536) a subset of flash memory devices associated with a flash controller of the plurality of controllers on the memory device (e.g., erasing a subset of NVM devices 140-1 through 140-*n* associated with NVM controller 130-1). For example, in some embodiments, erasing a subset of flash memory devices associated with a flash controller of the plurality of controllers on the memory device includes erasing two (out of n) flash memory devices (e.g., NVM device 140-1 and NVM device 140-3, FIG. 1) associated with a flash controller (e.g., NVM controller 130-1, FIG. 1). In some implementations, an erase module of the secure erase circuitry and/or an erase module of one or more controllers (e.g., erase module 218, FIG. 2, erase module 314, FIG. 3, and/or erase module 414, FIG. 4) are used to erase a subset of flash memory devices associated with a flash controller of the plurality of controllers on the memory device, as described above with respect to FIGS. 2-4.

In some embodiments, erasing (532) one or more non-volatile memory devices on the memory device includes erasing (538) all flash memory devices associated with a flash controller of the plurality of controllers on the memory device. For example, in some embodiments, erasing all flash memory devices associated with a flash controller of the plurality of controllers on the memory device includes erasing n (out of n) flash memory devices (e.g., NVM device 140-1 through NVM device 140-*n*, FIG. 1) associated with a flash controller (e.g., NVM controller 130-1, FIG. 1). In some implementations, an erase module of the secure erase circuitry and/or an erase module of one or more controllers (e.g., erase module 218, FIG. 2, erase module 314, FIG. 3, and/or erase module 414, FIG. 4) are used to erase all flash memory devices associated with a flash controller of the plurality of controllers on the memory device, as described above with respect to FIGS. 2-4.

In some embodiments, erasing (532) one or more non-volatile memory devices on the memory device includes erasing (540) all flash memory devices associated with a subset of flash controllers of the plurality of controllers on the memory device. For example, in some embodiments, erasing all flash memory devices associated with a subset of flash controllers of the plurality of controllers (e.g., associated with 2 flash controllers out of m flash controllers) on the memory device includes erasing n (out of n) flash memory devices (e.g., NVM device 140-1 through NVM device 140-*n*, FIG. 1) associated with a first flash controller (e.g., NVM controller 130-1, FIG. 1) and erasing p (out of p) flash memory devices (e.g., NVM device 141-1 though NVM device 141-*p*, not shown in FIG. 1) associated with a second flash controller (e.g., NVM controller 130-2, not shown in FIG. 1). In some implementations, an erase module of the secure erase circuitry and/or an erase module of one or more controllers (e.g., erase module 218, FIG. 2, erase module 314, FIG. 3, and/or erase module 414, FIG. 4) are used to erase all flash memory devices associated with a subset of flash controllers of the plurality of controllers on the memory device, as described above with respect to FIGS. 2-4.

In some embodiments, erasing (532) one or more non-volatile memory devices on the memory device includes erasing (542) all flash memory devices associated with all flash controllers of the plurality of controllers on the memory device. For example, in some embodiments, erasing all flash memory devices associated with all flash controllers of the plurality of controllers on the memory device includes erasing n (out of n) flash memory devices (e.g., NVM device 140-1 through NVM device 140-*n*, FIG. 1) associated with a first flash controller (e.g., NVM controller 130-1, FIG. 1), erasing k (out of k) flash memory devices (e.g., NVM device 142-1 through NVM device 142-*k*, FIG. 1) associated with a last flash controller (e.g., NVM controller 130-*m*, FIG. 1), and every flash memory device in between (not shown in FIG. 1). In some implementations, an erase module of the secure erase circuitry and/or an erase module of one or more controllers (e.g., erase module 218, FIG. 2, erase module 314, FIG. 3, and/or erase module 414, FIG. 4) are used to erase all flash memory devices associated with all flash controllers of the plurality of controllers on the memory device, as described above with respect to FIGS. 2-4.

In some embodiments, erasing (532) one or more non-volatile memory devices on the memory device includes erasing (544) the one or more non-volatile memory devices in a predefined sequence. In some embodiments, since secure erase functions typically consume more power than regular operations, the erasing is sequenced so a peak power limit is not reached or exceeded. As explained above with respect to operation 530, in some implementations, the one or more non-volatile memory devices are erased sequentially, in parallel, or with a combination of sequential and parallel sequencing. In some implementations, an erase module on secure erase circuitry and/or on one or more controllers (e.g., erase module 218, FIG. 2, erase module 314, FIG. 3, and/or erase module 414, FIG. 4) are used to erase the one or more non-volatile memory devices in a predefined sequence, as described above with respect to FIGS. 2-4.

In some embodiments, the predefined sequence is (546) programmable. For example, in some implementations, the predefined sequence is programmed to include sequential erasing (e.g., erasing NVM devices associated with NVM controller 130-1, followed by erasing NVM devices associated with NVM controller 130-2, etc.). In some implementations, the predefined sequence is programmed to include parallel erasing (e.g., erasing NVM devices associated with a first NVM controller 130-1 in parallel with erasing NVM devices associated with a second NVM controller 130). In some implementations, the predefined sequence is programmed to include a combination of sequential and parallel sequencing (e.g., erasing NVM devices associated with a first NVM controller 130-1, followed by erasing NVM devices associated with a second NVM controller 130 in parallel with erasing NVM devices associated with a third NVM controller 130).

In some embodiments, the non-volatile memory comprises (548) one or more flash memory devices (e.g., NVM devices 140, 142, FIG. 1). In some implementations, the non-volatile memory includes a single flash memory device, while in other implementations the non-volatile memory includes a plurality of flash memory devices. In some implementations, the non-volatile memory includes NAND-type flash memory or NOR-type flash memory. In other embodiments, the non-volatile memory comprises one or more other types of non-volatile storage devices.

In some embodiments, the memory device is or includes (550) a dual in-line memory module (DIMM) device. In some implementations, the memory device is compatible with a DIMM memory slot. For example, in some implementations, the memory device is compatible with a 240-pin DIMM memory slot and is compatible with signaling in accordance with a DDR3 interface specification.

Next, the secure erase operation includes (520) monitoring (552) the secure erase operation. In some implementations, monitoring the secure erase operation includes monitoring (1) current completion status of the secure erase operation, (2) time spent on the secure erase operation, and/or (3) other information regarding the secure erase operation. In some implementations, a monitor module (e.g., monitor module 220, FIG. 2) is used to monitor the secure erase operation, as described above with respect to FIG. 2.

The secure erase operation also includes (520) recording (554) data related to the secure erase operation. In some embodiments, data related to the secure erase operation is recorded to non-volatile memory associated with the secure erase circuitry (e.g., SPD device 124 associated with secure erase circuitry 126, FIG. 1). In some embodiments, recording data related to the secure erase operation includes recording (1) a timestamp or other time value that indicates or represents the time (e.g., a real time clock value) when a secure erase operation was triggered (or requested or generated) (e.g., Thursday, Oct. 17, 2013, at 12:03:17 AM), (2) current status of the request (or trigger) of the secure erase operation, (3) current completion status of the secure erase operation, (4) reason for the secure erase operation (e.g., what type of secure erase trigger was detected), (5) the length of time the secure erase operation took to complete, and/or (6) other information regarding the secure erase operation. In some implementations, a recording module (e.g., recording module 222, FIG. 2) is used to record data related to the secure erase operation, as described above with respect to FIG. 2.

Optionally, the secure erase operation includes (520) preventing (556) continued operation of the memory device by a host system. In some embodiments, for example, if the memory device is powered off during the secure erase operation, after the memory device powers back up, the memory device disallows (e.g., ignores, or does not execute) host commands (e.g., from computer system 110, FIG. 1) and continues erasing the one or more non-volatile memory devices. In some implementations, a prevention module (e.g., prevention module 224, FIG. 2) is used to prevent continued operation of the memory device by a host system, as described above with respect to FIG. 2.

Optionally, the memory device blocks (558) host data (e.g., data received from one or more hosts, and associated error correction values) from being preserved (sometimes called "hardened") in response to data hardening events that occur while performing the secure erase operation. For example, while performing the secure erase operation, the memory device does not allow data hardening events to harden host data (e.g., host data is not transferred from volatile memory to non-volatile memory in response to a power failure). Instead, in some implementations, if the memory device loses power during the secure erase operation, the memory device saves the current secure erase state and device usage and/or endurance metadata for the non-volatile memory devices being erased, and resumes the secure erase operation after the memory device regains power. In some implementations, a prevention module (e.g., prevention module 224, FIG. 2) is used to block host data from being preserved in response to data hardening events while performing the secure erase operation, as described above with respect to FIG. 2. For example, in some embodiments, the method includes, in response to a data hardening event that occurs after initiation but prior to completion of the secure erase operation, saving metadata but not host data for the non-volatile memory devices to be erased by the secure erase operation. In some implementations, the metadata saved includes metadata representing or corresponding to cumulative usage and/or remaining endurance, maintained for respective portions (e.g., blocks, superblocks, or other storage units) of the non-volatile memory devices being erased.

In some embodiments, erasing one or more non-volatile memory devices on the memory device includes preserving at least predefined portions of metadata (e.g., usage metrics indicating or corresponding to cumulative usage or remaining endurance, maintained for respective portions (e.g., blocks, superblocks, or other storage units) of the non-volatile memory devices) on the memory device, while host data stored in the one or more non-volatile memory devices on the memory device is erased. For further information concerning preserving metadata while erasing data, see U.S. Provisional Patent Application No. 61/911,403, filed Dec. 3, 2013, and U.S. application Ser. No. 14/135,256, filed Dec. 19, 2013, both of which are herein incorporated by reference in their entireties.

Optionally, prior to performing the secure erase operation, the memory device determines (560) whether a variable is set to prevent the secure erase operation. In some embodiments, the variable is stored in non-volatile memory associated with the secure erase circuitry (e.g., in SPD device 124 associated with secure erase circuitry 126, FIG. 1). In some embodiments, the variable is set when conditions that would normally trigger a secure erase should be overridden or ignored (e.g., during manufacturing and/or testing). In some implementations, a prevention module (e.g., prevention module 224, FIG. 2) is used to determine whether a variable is set (or has been set) to prevent the secure erase operation, as described above with respect to FIG. 2.

In some embodiments, the aforementioned variable is password protected (562), thereby preventing modification of the variable's value except in accordance with the provision of a password matching a previously established password. In some implementations, the variable is stored in non-volatile memory and is safeguarded against modification (sometimes called editing) unless a password matching the previously established password is entered. In some embodiments, editing the variable includes setting the variable to prevent the secure erase operation. In some embodiments, editing the variable includes resetting the variable to allow the secure erase operation. In some implementations, the variable is stored as a flag. In some implementations, the variable is stored as a command.

Further, in some implementations, in accordance with a determination that the variable is set, the memory device prevents (564) performance of the secure erase operation. In some embodiments, as long as the variable is set, performance of the secure erase operation is prevented (e.g., secure erase functionality is disabled when the variable is set). In some implementations, a prevention module (e.g., prevention module 224, FIG. 2) is used to prevent performance of the secure erase operation, as described above with respect to FIG. 2.

In some implementations, with respect to any of the methods described above, the non-volatile memory is a single flash memory device, while in other implementations, the non-volatile memory includes a plurality of flash memory devices.

In some implementations, with respect to any of the methods described above, a memory device includes (1) an interface for coupling the memory device to a host system, (2) a plurality of controllers (e.g., including a storage controller and one or more flash controllers), and (3) secure erase circuitry including one or more processors, the memory device configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of erasing data in a memory device, the method comprising:
   in the memory device, the memory device having a plurality of hardware controllers:
      detecting a secure erase trigger;
      determining a secure erase algorithm from among a plurality of secure erase algorithms to use in accordance with the detected secure erase trigger;
      performing a secure erase operation in accordance with the determined secure erase algorithm, the secure erase operation including:
         signaling a secure erase condition to the plurality of hardware controllers on the memory device;
         erasing, in parallel, two or more non-volatile memory devices on the memory device;
         monitoring the secure erase operation, wherein monitoring the secure erase operation includes monitoring a completion status of the secure erase operation; and
         based on the monitoring, recording data related to the secure erase operation, the recorded data including data indicating the completion status of the secure erase operation.

2. The method of claim 1, further comprising saving data indicating a state of the secure erase operation in response to a loss of power prior to completion of the secure erase operation.

3. The method of claim 1, wherein the plurality of secure erase algorithms include at least one algorithm to overwrite a storage medium with specific overwrite patterns and at least one algorithm other than an overwrite algorithm.

4. The method of claim 1, wherein the secure erase trigger includes a secure erase signal from a host system, and wherein the secure erase signal is communicated from the host system to the memory device through a Serial Presence Detect (SPD) interface.

5. The method of claim 1, wherein at least one of the plurality of secure erase algorithms applies a high energy impulse to destroy the one or more volatile memory devices on the memory device.

6. The method of claim 1, wherein the secure erase trigger is internally generated in the memory device when predefined criteria are satisfied, the predefined criteria including connection of the memory device to a new slot location.

7. The method of claim 1, wherein the secure erase trigger is internally generated in the memory device when predefined criteria are satisfied, the predefined criteria including failure to receive a command to preserve the memory device in a predetermined time period.

8. The method of claim 1, wherein the secure erase trigger is generated by a debug port associated with the memory device, wherein the debug port is password protected.

9. The method of claim 1, wherein the plurality of controllers on the memory device include a storage controller and one or more flash controllers, the one or more flash controllers coupled by the storage controller to a host interface of the memory device.

10. The method of claim 1, wherein the plurality of controllers on the memory device include at least one non-volatile storage controller and at least one other storage controller other than the at least one non-volatile storage controller.

11. The method of claim 1, wherein one of the plurality of controllers on the memory device maps double data rate (DDR) interface commands to serial advance technology attachment (SATA) interface commands.

12. The method of claim 1, wherein erasing one or more non-volatile memory devices on the memory device includes putting the memory device into a state that will erase the one or more non-volatile memory devices on the memory device the next time the memory device is powered up.

13. The method of claim 1, wherein performing a secure erase operation further includes preventing continued operation of the memory device by a host system.

14. The method of claim 1, wherein signaling the secure erase condition to the plurality of controllers on the memory device includes separately signaling the secure erase condition to each of the plurality of controllers.

15. The method of claim 1, wherein erasing one or more non-volatile memory devices on the memory device includes erasing a subset of flash memory devices associated with a flash controller of the plurality of controllers on the memory device.

16. The method of claim 1, wherein erasing one or more non-volatile memory devices on the memory device includes erasing all flash memory devices associated with a flash controller of the plurality of controllers on the memory device.

17. The method of claim 1, wherein erasing one or more non-volatile memory devices on the memory device includes erasing all flash memory devices associated with a subset of flash controllers of the plurality of controllers on the memory device.

18. The method of claim 1, wherein erasing one or more non-volatile memory devices on the memory device includes erasing all flash memory devices associated with all flash controllers of the plurality of controllers on the memory device.

19. The method of claim 1, wherein erasing one or more non-volatile memory devices on the memory device includes erasing the one or more non-volatile memory devices in a predefined sequence.

20. The method of claim 19, wherein the predefined sequence is programmable.

21. The method of claim 1, further comprising blocking host data from being preserved in response to data hardening events that occur while performing the secure erase operation.

22. The method of claim 1, further comprising:
prior to performing the secure erase operation, determining whether a variable is set to prevent the secure erase operation; and
in accordance with a determination that the variable is set, preventing performance of the secure erase operation.

23. The method of claim 1, wherein signaling the secure erase condition to the plurality of hardware controllers on the memory device further comprises:
signaling a first hardware controller of the plurality of hardware controllers to securely erase a first portion of the one or more non-volatile memory devices, and
signaling a second hardware controller of the plurality of hardware controllers to securely erase a second portion of the one or more non-volatile memory devices in parallel with the first hardware controller securely erasing the first portion of the one or more non-volatile memory devices.

24. The method of claim 1, wherein the non-volatile memory comprises one or more flash memory devices.

25. The method of claim 1, wherein the memory device includes a dual in-line memory module (DIMM) device.

26. A memory device, comprising:
an interface for coupling the memory device to a host system;
two or more controllers; and
secure erase circuitry including one or more processors, the secure erase circuitry configured to:
detect a secure erase trigger;
determine a secure erase algorithm from among a plurality of secure erase algorithms to use in accordance with the detected secure erase trigger;
perform a secure erase operation in accordance with the determined secure erase algorithm, the secure erase operation including:
signaling a secure erase condition to a plurality of the two or more controllers on the memory device;
erasing, in parallel, two or more non-volatile memory devices on the memory device;
monitoring the secure erase operation, wherein monitoring the secure erase operation includes monitoring a completion status of the secure erase operation; and
based on the monitoring, recording data related to the secure erase operation, the recorded data including data indicating the completion status of the secure erase operation.

27. The memory device of claim 26, wherein the plurality of controllers on the memory device include a storage controller and one or more flash controllers, the one or more flash controllers coupled by the storage controller to a host interface of the memory device.

28. The memory device of claim 26, wherein the interface for coupling the memory device to a host system comprises a double data rate (DDR) interface, and the secure erase signal from the host system is communicated to the memory device through the double data rate (DDR) interface.

29. The memory device of claim 26, wherein the plurality of secure erase algorithms include at least one algorithm to overwrite a storage medium with specific overwrite patterns and at least one algorithm other than an overwrite algorithm.

30. A non-transitory computer readable storage medium, storing one or more programs for execution by one or more hardware processors of a memory device having a plurality of hardware controllers and secure erase circuitry, the one or more programs including instructions for:
detecting a secure erase trigger;
determining a secure erase algorithm from among a plurality of secure erase algorithms to use in accordance with the detected secure erase trigger;
performing a secure erase operation in accordance with the determined secure erase algorithm, the secure erase operation including:
signaling a secure erase condition to the plurality of hardware controllers on the memory device;
erasing, in parallel, two or more non-volatile memory devices on the memory device;
monitoring the secure erase operation, wherein monitoring the secure erase operation includes monitoring a completion status of the secure erase operation; and
based on the monitoring, recording data related to the secure erase operation, the recorded data including data indicating the completion status of the secure erase operation.

* * * * *